Patented Oct. 8, 1935

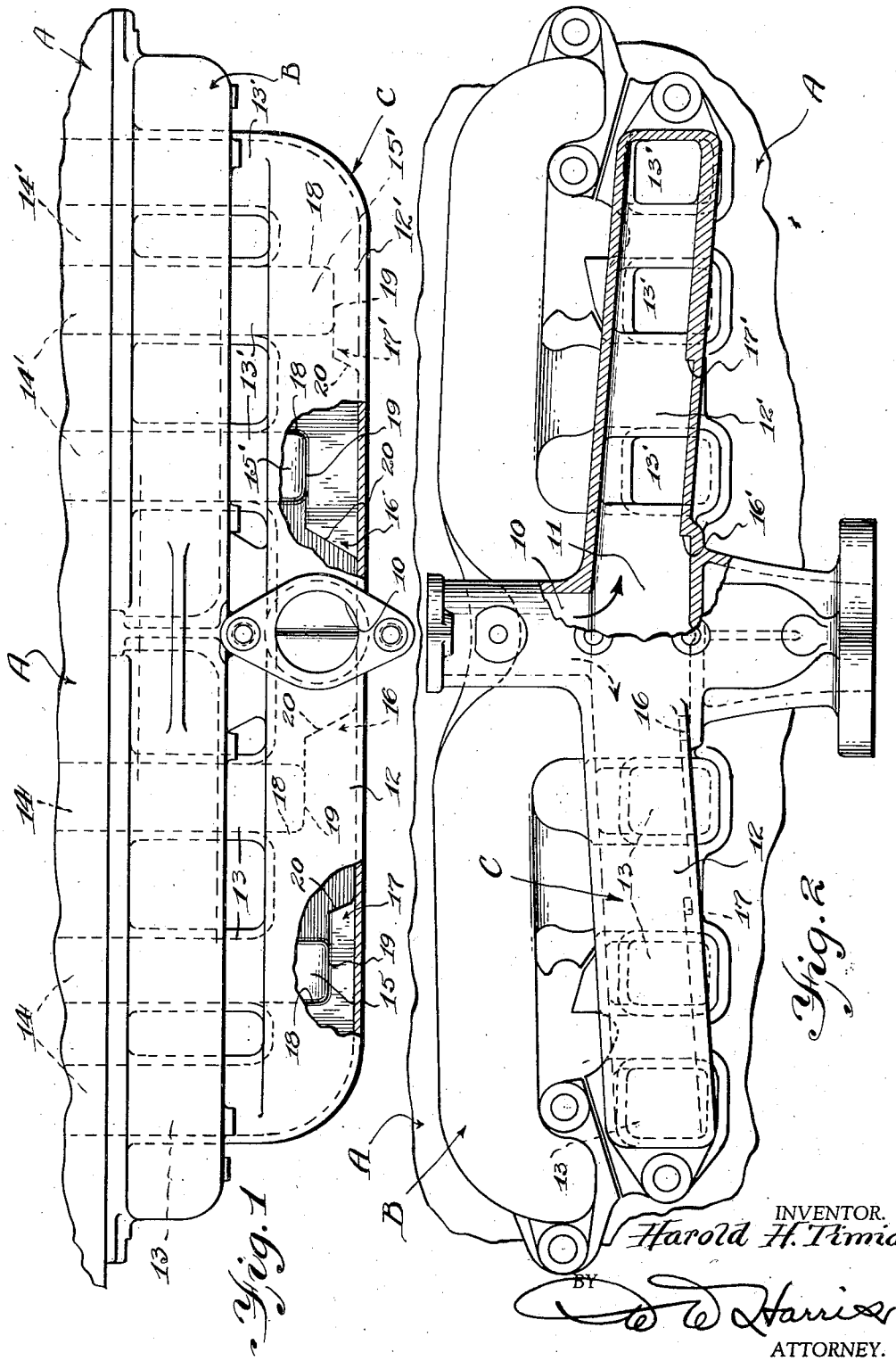

2,016,697

UNITED STATES PATENT OFFICE 2,016,697

ENGINE

Harold H. Timian, Detroit, Mich., assignor to Continental Motors Corporation, Detroit, Mich., a corporation of Virginia Application June 7, 1933, Serial No. 674,639

10 Claims. (Cl. 123—52)

My invention relates to internal combustion engines and more particularly to the fuel mixture distributing system for said engines with special reference to the intake manifold structure and the means carried thereby for controlling the distribution of the wet fuel precipitate during engine operation.

The control of wet fuel distribution has a direct bearing on engine performance, and is of special importance at relatively low load engine operation including that condition when the engine is idling and when the engine is accelerated. The control of wet fuel distribution is also of particular importance in connection with down draft manifold structures because of the fact that there is a greater tendency for wet fuel to accumulate in the distributing chamber and in the lateral runners of the manifold structure in a down draft manifold than is the case with an updraft manifold which has been more commonly employed heretofore.

It is an object of my invention to improve engine performance and in particular that performance at relatively low load operation and for engine acceleration by providing an improved manifold structure for distributing the fuel mixture to the engine cylinders, the particular objects of my invention being attained by reason of improvements in controlling the wet fuel distribution.

Another object of my present invention is to provide an improved intake manifold structure for an internal combustion engine by incorporating therewith means acting on the wet fuel flow whereby to control the distribution of the wet fuel to a plurality of port runners connecting the lateral manifold runner with the engine cylinders.

More particularly I attain these objects by constructing the lateral fuel mixture conducting portion or runner of the manifold structure with one or more abrupt steps in the vicinity of the several port runners, these steps acting on the wet fuel flow or precipitate whereby to control the distribution of said wet fuel to said plurality of port runners.

For a further understanding of my invention, reference may be had to the accompanying drawing illustrating a preferred embodiment of my invention, and in which:

Fig. 1 is a plan view of the manifold structure for an internal combustion engine and showing portions of the intake manifold structure broken away to show the interior construction, and Fig. 2 is a side elevational view of what is shown in Fig. 1 with portions of the intake manifold structure broken away to show the interior construction.

I have chosen for purposes of illustration to show my invention as applied to an internal combustion engine A of the multi-cylinder type, the manifold structure shown in the accompanying drawing comprising an exhaust manifold B and an intake manifold C. It is customary at the present time to construct the exhaust and intake manifolds as an integral structure but insofar as my present invention is concerned, I wish it understood that such an integral construction as shown in the drawing is not essential in carrying out the teachings of my invention, since my invention is more particularly related to the intake manifold and the means carried thereby for controlling the distribution of wet fuel to the engine.

In the illustrated embodiment of my invention I have provided an intake manifold including a primary fuel mixture conducting portion 10 depending downwardly from an engine carburetor (not shown) to the manifold distributing chamber 11. A pair of oppositely extending lateral runners 12 and 12' communicate with the distributing chamber 11, and each runner 12 and 12' is connected with the engine by reason of the port runners 13 and 13' respectively, the outlets of said port runners being connected with the intake passages 14 and 14' respectively of the engine structure. It will be noted that the lateral runners 12 and 12' are inclined downwardly from the distributing chamber 11 towards the ends of the engine structure and the port runners 13 and 13' open in the floor of said lateral runners as shown at 15 and 15' (see Fig. 1). The above described construction is especially adapted for use with a manifold structure of the downdraft type and this novel structure is described and claimed in my copending application, Ser. No. 658,691, filed Feb. 27, 1933.

A study of the action and operation of the fuel mixture distributing systems as employed with engines of the internal combustion type has shown that at relatively low engine speeds, a considerable amount of wet fuel is precipitated from the walls of the fuel mixture conducting means. The major portion of this fuel precipitate collects on the floor of the distributing chamber and the connecting floors of the lateral runners. During engine acceleration this wet fuel is swept into the port runners connecting the lateral runners with the engine cylinders, and it is quite essential in order to obtain good engine performance for relatively low load engine operation and when accelerating the engine, to accurately control the distribution of this wet fuel precipitate. In my present invention I have provided a novel intake manifold structure which is constructed to take care of the distribution of the wet fuel under the aforesaid conditions, and I have attained my objects by providing the lateral runners with a plurality of abrupt steps so associated and arranged with respect to the port runners communicating with said lateral runners for acting on said wet fuel flow whereby to control the distribution thereof to the port runners.

More specifically I have provided the steps 16, 17 and 16', 17' respectively located in the floors of the lateral runners 12 and 12'. It will be noted that these stepped portions extend generally transversely of the lateral runners and it will also be noted that these steps bound the rear edge of the opening 15 at 15' as at 18, they also bound the side edge of said opening as at 19 and then continue transversely across the lateral runners as at 20, the edge 20 of this stepped portion being preferably located in advance of the opening 15 and 15' and preferably inclined to both the longitudinal and transverse axes of the lateral runners as shown in Fig. 1. It will be noted that I have provided a plurality of stepped portions for each of said lateral runners, these stepped portions being successively arranged and spaced longitudinally of said lateral runners and substantially located in the vicinity of said port runners. It will be also noted that the said lateral runners are so arranged that these stepped portions provide lateral runner portions of progressively decreasing cross-sectional area for facilitating the distribution of the fuel to the engine cylinders.

The successively arranged stepped portions carried by the lateral runners are so constructed as to induce the proper amount of wet fuel to flow into the intermediate port runners instead of being carried longitudinally of the lateral runners and rammed into the end port runners as is the case with many intake manifold structures as heretofore employed.

I am aware of the fact that obstructions or other baffles have been employed in intake manifold structures for the purpose of revaporizing wet fuel by deflecting the wet fuel particles into the fuel mixture stream, and further said baffles have been employed for acting on the wet fuel in conjunction with other additional distributing devices, but in the present invention, I have provided a plurality of abrupt steps associated with the port runners and which cooperate together for controlling the distribution of the fuel precipitate to the plurality of port runners connecting said lateral runners with the engine cylinders.

It will be obviously understood that various types of engines may necessitate stepped portions of different contour and of various types, but in general, said stepped portions are extended substantially transversely of the lateral runners in order to control said wet fuel distribution. Further the spacing of said stepped portions longitudinally of the lateral runners may be varied under various conditions and for various types of engines.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. An intake manifold structure for an internal combustion engine, including a distributing chamber, a lateral runner extending substantially longitudinally of the engine from said chamber, and a plurality of spaced port runners communicating with said lateral runner, said lateral runner having a plurality of stepped floor portions acting on the wet fuel flow whereby to control the distribution of the wet fuel to said port runners.

2. An intake manifold structure for an internal combustion engine, including a distributing chamber, a lateral runner extending substantially longitudinally of the engine from said chamber, and a plurality of spaced port runners communicating with said lateral runner, said lateral runner having a stepped floor portion in the vicinity of each of said port runners and acting on the wet fuel flow whereby to control the distribution of the wet fuel to said port runners, the floor beyond the step extending at a level above the floor in advance of the step.

3. An intake manifold structure for an internal combustion engine, including a distributing chamber, a lateral runner extending substantially longitudinally of the engine from said chamber, and a plurality of spaced port runners communicating with said lateral runner, said lateral runner having a plurality of successive stepped floor portions, each of said step portions being located in the vicinity of the junction of a port runner and the lateral runner and acting on the wet fuel flow whereby to control the distribution of the wet fuel to said port runners.

4. An intake manifold structure for an internal combustion engine, including a distributing chamber, a lateral runner extending substantially longitudinally of the engine from said chamber, and a plurality of spaced port runners communicating with said lateral runner, said lateral runner having a plurality of successive stepped floor portions extending obliquely to the longitudinal axis of the lateral runner, each of said step portions being located in the vicinity of the junction of a port runner and the lateral runner and acting on the wet fuel flow whereby to control the distribution of the wet fuel to said port runners.

5. An intake manifold structure for an internal combustion engine, including a lateral runner extending substantially longitudinally of the engine, and a plurality of spaced port runners communicating with said lateral runner, said lateral runner having a plurality of successive stepped portions extending obliquely to the longitudinal axis of the lateral runner, each of said stepped portions being located in part in advance of the junction of a port runner and the lateral runner and acting on the wet fuel flow whereby to control the distribution of the wet fuel to said port runners.

6. An intake manifold structure for an internal combustion engine, including a lateral runner extending substantially longitudinally of the engine, a plurality of port runners communicating with said lateral runner, the floor of said lateral runner being provided with an abrupt step adjacent to one of said port runners extending transversely thereof for acting on the wet fuel flow whereby to control the distribution of the wet fuel to said port runners, the floor beyond the step extending at a level above the floor in advance of the step.

7. An intake manifold structure for an internal combustion engine, including a lateral runner extending substantially longitudinally of the engine, a plurality of port runners communicating with said lateral runner, said lateral runner having a wall portion on which wet fuel is adapted to accumulate and which is provided with a plurality of successively arranged abrupt steps each adjacent to one of said port runners and each extending transversely of the lateral runner for acting on the wet fuel flow whereby to control the distribution of the wet fuel to said port runners, each successive floor portion beyond each of said steps extending at a level above the floor portion preceding the said steps.

8. An intake manifold structure for an internal combustion engine, including a lateral runner extending substantially longitudinally of the engine, a plurality of port runners communicating with said lateral runner, said lateral runner having a wall portion on which wet fuel is adapted to accumulate and which is provided with a plurality of successively arranged abrupt steps each adjacent to one of said port runners and each extending transversely of the lateral runner for acting on the wet fuel flow whereby to control the distribution of the wet fuel to said port runners, said steps providing successive lateral runner portions of progressively decreasing cross-sectional area.

9. An intake manifold structure for an internal combustion engine, including a lateral runner extending substantially longitudinally of the engine, a plurality of port runners communicating with said lateral runner, and opening in the floor thereof, the floor of said lateral runner having a plurality of abrupt steps each associated with one of said port runners and acting on the wet fuel flow in said lateral runner whereby to control the distribution of the wet fuel to said port runners.

10. An intake manifold structure for an internal combustion engine, including a lateral runner extending substantially longitudinally of the engine, a plurality of port runners communicating with said lateral runner, and opening in the floor thereof, the floor of said lateral runner having a plurality of abrupt steps each associated with one of said port runners, the steps being arranged to bound the rear and side edge of the floor opening and extending transversely of the lateral runner, said steps acting on the wet fuel flow whereby to control the distribution of the wet fuel to said port runners.

HAROLD H. TIMIAN.